(12) United States Patent
Bucknell et al.

(10) Patent No.: US 11,884,025 B2
(45) Date of Patent: Jan. 30, 2024

(54) THREE-DIMENSIONAL PRINTER AND METHODS FOR ASSEMBLING PARTS VIA INTEGRATION OF ADDITIVE AND CONVENTIONAL MANUFACTURING OPERATIONS

(71) Applicant: DIVERGENT TECHNOLOGIES, INC., Los Angeles, CA (US)

(72) Inventors: John Russell Bucknell, Los Angeles, CA (US); Broc William TenHouten, Los Angeles, CA (US); Eahab Nagi El Naga, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 185 days.

(21) Appl. No.: 16/792,124

(22) Filed: Feb. 14, 2020

(65) Prior Publication Data

US 2021/0252803 A1  Aug. 19, 2021

(51) Int. Cl.
  *B29C 69/00* (2006.01)
  *B29C 64/153* (2017.01)
  (Continued)

(52) U.S. Cl.
  CPC .............. *B29C 69/001* (2013.01); *B22F 3/24* (2013.01); *B22F 10/00* (2021.01);
  (Continued)

(58) Field of Classification Search
  CPC ..... B29C 64/153; B29C 69/001; B29C 64/35; B29C 64/393; B29C 64/188; B22F 12/22;
  (Continued)

(56) References Cited

U.S. PATENT DOCUMENTS 5,203,226 A  4/1993  Hongou et al.
5,742,385 A  4/1998  Champa
(Continued)

FOREIGN PATENT DOCUMENTS

WO  1996036455 A1  11/1996
WO  1996036525 A1  11/1996
(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Monica A Huson
*Assistant Examiner* — Kelsey C Grace
(74) *Attorney, Agent, or Firm* — ARENTFOX SCHIFF LLP

(57) ABSTRACT

A three-dimensional (3-D) printer and technique for integrating additive and non-print manufacturing operations is disclosed. In an aspect, the 3-D printer includes an energy source and a powder bed regions for selectively fusing layers of a build piece. The 3-D printer further includes a robotic arm. The 3-D printing is interrupted responsive to instructions from a controller, upon which the robotic arm may perform one or more non-printing operations using the build piece such as milling, casting, molding, pressing, and the like. Following the non-printing operations, the 3-D printing operation continues, and a resulting assembly including the build piece is produced.

21 Claims, 4 Drawing Sheets

(51) Int. Cl.

| | | |
|---|---|---|
| *B29C 64/35* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |
| *B22F 3/24* | (2006.01) | |
| *B25J 11/00* | (2006.01) | |
| *B33Y 40/20* | (2020.01) | |
| *B22F 10/00* | (2021.01) | |
| *B22F 10/10* | (2021.01) | |

(52) U.S. Cl.
CPC ......... *B25J 11/0055* (2013.01); *B29C 64/153* (2017.08); *B29C 64/35* (2017.08); *B29C 64/393* (2017.08); *B33Y 10/00* (2014.12); *B33Y 30/00* (2014.12); *B33Y 40/20* (2020.01); *B33Y 50/02* (2014.12); *B22F 10/10* (2021.01); *B22F 2003/247* (2013.01)

(58) Field of Classification Search
CPC .. B22F 3/24; B22F 10/50; B22F 10/28; B22F 10/00; B22F 12/84; B22F 10/10; B22F 2999/00; B22F 2003/247; B33Y 10/00; B33Y 50/02; B33Y 40/20; B33Y 30/00; B25J 11/0055; Y02P 10/25
See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |

(56) References Cited

U.S. PATENT DOCUMENTS

| | | |
|---|---|---|
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |

(56) References Cited

U.S. PATENT DOCUMENTS

| | | |
|---|---|---|
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0120387 A1* | 5/2017 | DeMuth ............... G02B 15/10 |
| 2017/0341309 A1 | 11/2017 | Piepenbrock et al. |
| 2018/0335766 A1* | 11/2018 | Jacobs, II ............. B33Y 40/00 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

THREE-DIMENSIONAL PRINTER AND METHODS FOR ASSEMBLING PARTS VIA INTEGRATION OF ADDITIVE AND CONVENTIONAL MANUFACTURING OPERATIONS

BACKGROUND

Field

The present disclosure relates to additive manufacturing of assemblies in transport structures such as automobiles, trucks, trains, boats, aircraft, motorcycles, metro systems, and the like, and more specifically to techniques for producing such assemblies by integrating additive and conventional manufacturing functions.

Background

Additive manufacturing (AM), also known as three-dimensional (3-D) printing, is providing rapidly-changing advances in the various manufacturing arts. Unlike the often costly and inflexible tooling techniques (milling, casting, molding, pressing, etc.) to which manufacturers have been restricted for producing vehicle parts, AM can be used to manufacture the same components with complex geometries and sophisticated interfaces, but without the extraordinary costs. Using an AM-based infrastructure, manufacturers that seek to develop new components for different products need no longer acquire expensive tooling updates that rely on the same production techniques used in antiquated assembly-line environments for over a century. Instead, manufacture can design data models for countless varieties of parts using a computer-aided-design (CAD) application. The new parts can then be 3-D printed, e.g., using a powder bed fusion (PBF) based or other 3-D printer.

The advent of AM in product manufacturing, however, presents a major added alternative, rather than a wholesale substitute, to conventional methods. Various occasions may necessitate the use of conventional techniques to perform manufacturing functions on components in an AM environment. An example may include machining an AM part where a high precision tolerance is required that may fall outside AM ranges. Another illustration may include using conventional techniques to press-fit different materials into a small region within a component. In these and other cases, conventional tooling may still play a key supporting role in manufacturing products such as transport structures. However, the use of conventional manufacturing techniques on AM parts necessitates added processing steps that may undesirably increase the overall time of the build.

SUMMARY

As a consequence, herein is proposed a 3-D printer and related technique for integrating AM with conventional non-print procedures to maximize efficiency and minimize production costs.

In one aspect of the disclosure, a three-dimensional (3-D) printer includes a frame including a substrate enclosed by walls to define a powder bed region, a depositor for successively depositing layers of powder in the powder bed region, an energy source mounted on the frame and operable for selectively fusing the deposited layers of powder to form a build piece based on instructions from a controller, and a robotic arm mounted on the frame and extendable over the substrate to perform at least one non-printing operation for assisting in construction of an assembly including at least a portion of the build piece during a period between fusing operations.

In another aspect of the disclosure, a method includes using a three-dimensional (3-D) printer including receiving controller instructions based on a data model of a build piece, 3-D printing the build piece based on the instructions, including depositing consecutive layers of powder onto a substrate and selectively fusing the layers using an energy source, interrupting the 3-D printing to perform at least one non-printing operation on the build piece, and resuming the 3-D printing after the at least one non-printing operation is performed to construct an assembly comprising at least a portion of the build piece.

In still another aspect of the disclosure, a three-dimensional (3-D) printer includes a frame, a powder bed region arranged in a lower portion of the frame, a depositor configured to deposit print material into the powder bed region, an energy source mounted on the frame and configured to selectively fuse successive layers of the deposited print material to form a build piece, a robotic arm coupled to the frame and configured to perform at least one non-printing operation on the build piece, and a controller configured to interrupt fusing by the energy source to enable the robotic arm to perform the non-printing operation and thereafter to enable resuming the fusing.

It will be understood that other aspects of intra-processing AM assemblies using non-AM processes will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of the methods and 3-D printers will now be presented in the detailed description by way of example, and not by way of limitation, in the accompanying drawings, wherein.

DETAILED DESCRIPTION

Figure 1:
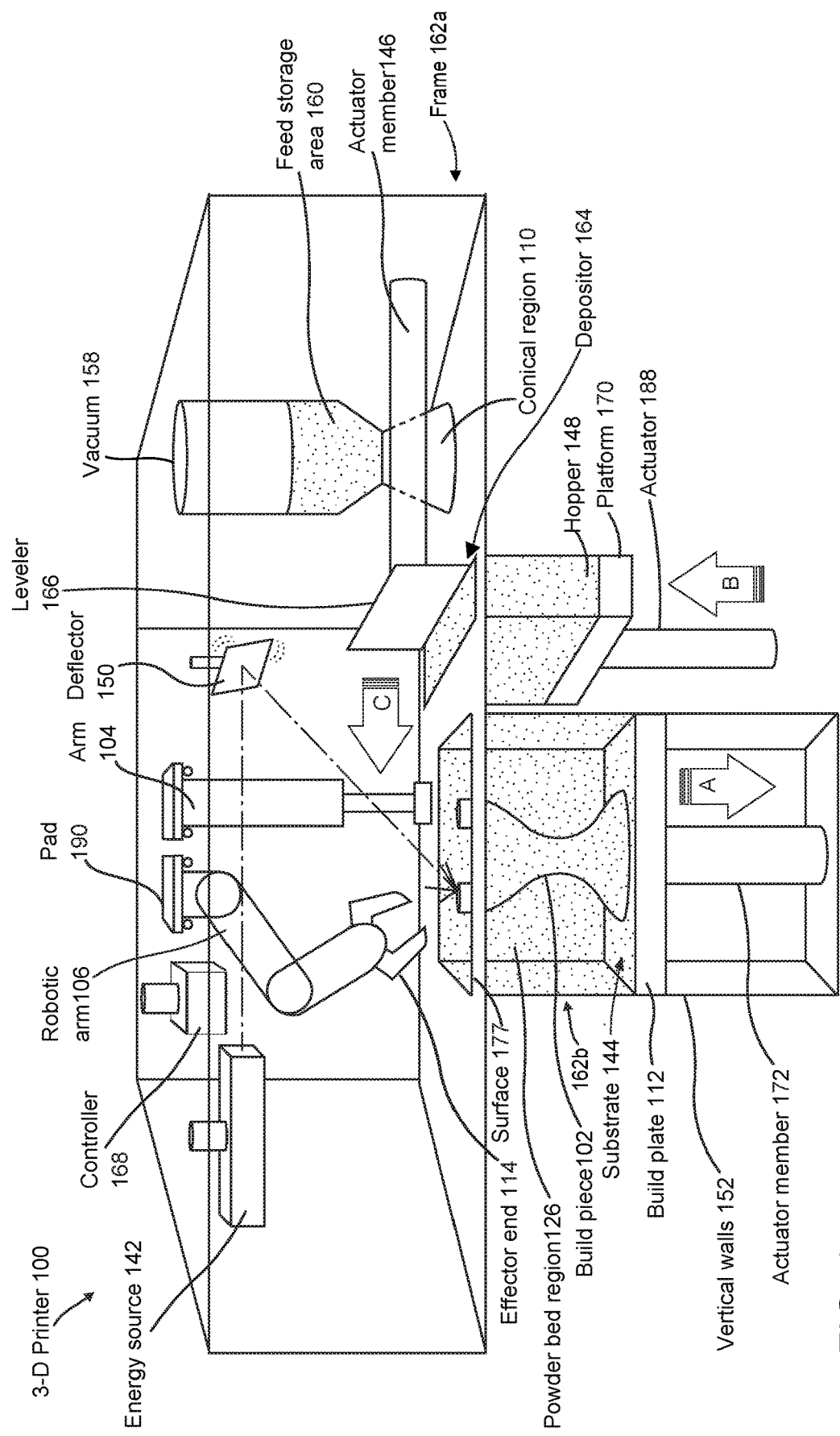
FIG. 1 is a perspective view of a 3-D printer capable of automatedly integrating additive and conventional manufacturing operations to construct an assembly in accordance with an exemplary embodiment.

The detailed description set forth below in connection with the appended drawings is intended to provide a description of various exemplary embodiments and is not intended to represent the only embodiments in which the invention may be practiced. The terms "example" and "exemplary" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various solutions have been implemented that attempt to incorporate additive manufacturing with conventional milling. For example, certain companies have incorporated PBF-based functionality into CNC machines. In these machines, a build piece can be additively manufactured using PBF technology. After the build piece has been completed, an operator can use a vacuum device to remove excess powder. Following removal of the excess powder, the machine's mill can be used to clean or mill regions of the part that may otherwise be inaccessible. The result is an AM part that has been milled, wherein efficiency of the operations has increased due to the integration of the additive and subtractive manufacturing processes for specific AM parts that require subsequent milling.

While the techniques above have provided partial solutions for integrating AM and milling of the finished build piece, to date the art has failed to address the intra-processing of AM and conventional or "non-print" operations in a manner that facilitates part assembly, and in particular part assembly using a combination of integrated operations. In these conventional techniques, the AM step is complete upon 3-D printing of the build piece, with the milling occurring solely as a finishing touch in the aftermath of the print. In that case, the assembly may have to undergo additional assembly and further manual operations. In addition, the assembly may have to be physically transported between different stations to undergo additional fabrication steps before the final assembly is complete. For many assemblies that would benefit from an integrated combination of manufacturing technologies, alternative solutions, such as those disclosed herein, are desirable.

In an aspect of the disclosure, a 3-D printer and method for assembling parts using an integrated combination of 3-D print and non-print operations is disclosed. A 3-D printer includes a chamber for enabling AM of build pieces. Additional components are integrated within the printer that enable the interruption of the print at any time. The partial build piece can thereupon be exposed to an integrated robotic arm that may be automatically programmed to performing a milling or machining operation on the piece. The robotic arm may include multiple effectors available to it to perform, pursuant to commands issued by a local controller, any number of non-print operations including milling, cutting, casting, pressing, and the like. In various embodiments, the 3-D printer further includes a hydraulic press for inserting components into a build piece such as a bearing, after which the AM operation may resume on the build piece to create an assembly including the build piece and the inserted components.

In another exemplary embodiment, (1) a build piece is 3-D printed, (2) the print function is interrupted, (3) a selected portion of the existing build piece is finely machined to fall within a precise tolerance in a machining operation following the AM interruption, (4) the selected machined portion is cut from the existing build piece and maintained by a handler effector on the arm, (5) AM resumes, wherein the uncut portion of the build piece on the substrate is modified to form a part with a suitably sized and shaped cavity, (6) the print function is again interrupted, (7) the arm, or a separate hydraulic press, inserts or press-fits the machined portion into the cavity in another non-print operation following the second AM interruption, and (8) AM resumes, wherein additional material is added to the existing build piece, e.g., to house or enclose the inserted machined portion, such that a resulting assembly using both print and non-print operations is constructed using a single machine.

In one of many alternative embodiments, the 3-D printer running the above production may instead be configured to print from scratch a second build piece into which the desired structure may be inserted or pressed. Multiple build pieces may be constructed and manipulated to form complex assemblies in a single device, in a single sequence of operations. In addition to the above described machining step, other non-print operations may be additionally or alternatively be performed. For example, where other non-AM structures (e.g., COTS parts) are desired for incorporation in the assembly, they may be placed in a dedicated area within the 3-D print chamber and later accessed and manipulated by the robotic arm. The robotic arm may also incorporate multiple effectors, which may similarly be stored in a dedicated location within or adjacent the printer. In other more complex embodiments, multiple arms may be used to conduct more complex or sophisticated conventional manufacturing operations, in addition to the functions dedicated to AM.

The foregoing examples are illustrative in nature of the substantial benefits of the disclosure. Numerous variations and deviations from the described procedures are equally feasible depending on the desired assembly, and all such embodiments are intended to fall within the scope of the disclosure. In some embodiments, AM is interrupted to enable performance of a simple milling operation, for example, before AM is resumed to produce the final assembly, which may constitute the build piece as modified by the milling procedure. Unlike conventional approaches where AM is completed prior to further operations, AM can be automatedly interrupted at any suitable time, e.g., to machine particular parts of the build piece where the robotic equipment orients the parts to easily access the regions of interest.

The foregoing examples may advantageously be conducted without the necessity of the typical delays of setup, station-to-station transport, costs of the extra manpower involved, and the burdensome requirement of using multiple machines and operators. The development of code, which is currently unique to different machines conducting different operations, may be grossly simplified in that a set of instructions for effecting a number of different operations can be consolidated into a single data model using a single application suite, wherein instructions based on the data model may be compiled for use on a single machine. In some embodiments, the techniques disclosed herein can essentially obviate the need for manual operations by automating the entire procedure end-to-end.

FIG. 1 is a perspective view of a 3-D printer 100 capable of automatedly integrating additive and conventional manufacturing operations to construct an assembly in accordance with an exemplary embodiment. For purposes of this illustration, the printer is a PBF printer employing any of numerous PBF techniques, such as, for example, direct metal laser sintering (DMLS), electron beam melting (EBM), selective heat sintering (SHS), selective laser melting (SLM), selective laser sintering (SLS) and the like. In other embodiments, a non-PBF 3-D printer may be used, such as a 3-D printer employing fused deposition modeling (FDM), fused filament fabrication (FFF), and other techniques. It should also be noted that elements of FIGS. 1 and 2A-D are not necessarily drawn to scale, but may be drawn larger or smaller for the purpose of better illustration of concepts described herein.

3-D printer 100 can include a frame 162a, 162b for housing the major components. In this embodiment, 3-D printer includes and upper portion 162a of the frame and a lower portion 162b of the frame. The 3-D printer includes a powder bed region 126, which may be arranged in the lower portion 162b of the frame. The geometry of the powder bed region 126 may be circumscribed around its sides by vertical walls 152. In this embodiment, vertical walls 152 correspond to the lower portion 162b of the frame; however, this need not be the case. Substrate 144 may, in turn, demarcate the lower bound of powder bed region 126. Substrate 144 may be a surface of a build plate 144, which is positioned to reside near the top of the powder bed region 126 near the beginning of a 3-D print job and to gradually move downward during the AM process as described below, thus changing the volume of the powder bed region 126.

The 3-D printer 100 further includes an energy source 142, which may be mounted or coupled to an upper portion 162a of the frame. The energy source 142 may vary based on the type of PBF printer, and may include, for example, a laser, an electron beam, an electric arc, etc. The energy source 142 may be activated pursuant to instructions from a controller 168. The controller 168 may include a processing unit having one or more processors for executing instructions. The controller 168 may receive printing instructions from an external application, such as a CAD application, based on a data model of a 3-D object to be built. The controller 168 may include one or more memory units, e.g., for storing code for execution by the processor. The instructions may be provided to the controller 168 over a local cable, over a wired or wireless network, or by manual installment of a computer-readable medium (e.g., a CD, DVD, flash memory, etc.) into a dedicated interface on the printer. In other embodiments, the 3-D printer 100 has a user interface that enables a user to construct the data model and create the application that includes the manufacturing instructions.

The controller 168 may be located in one principal region of the 3-D printer, or in other configurations, the controller 168 may be implemented using a series of separate controller units for operating different portions of the 3-D printer 100. The controller units may be physically distributed in different locations of the 3-D printer and may communicate with other controller units via an internal wiring system or other means.

In various embodiments, the controller 168 may include dedicated hardware in part or in whole, such as one or more digital signals processors, digital logic circuits, or a combination thereof, for interpreting instructions and activating/deactivating the relevant 3-D printer component using precise timing (e.g. depositor, energy source, build plate, etc.).

As noted above, the controller 168 may include one or more memory units. In various embodiments, the controller 168 may include or interface with different memory types, including random access memory (RAM) (such as static or dynamic RAM), and/or read only memory (ROM) such as programmable read only memory (PROM), erasable programmable read only memory (EPROM), electrically erasable programmable read only memory (EEPROM), and the like. The controller 168 may run code as software or firmware. In an embodiment, the firmware of the 3-D printer or the controller can be updated. In some embodiments, the controller 168 or portions thereof may execute instructions and commands entirely in hardware.

In an exemplary embodiment, the controller 168 may be directly integrated into the 3-D printer 100 and, as noted above, the controller 168 may be configured to receive programs or instructions via one or more inputs or user interfaces at the printer. For example, the 3-D printer 100 may receive a data model of a 3-D object to be printed based on a CAD representation, or it may receive a set of compiled print instructions derived from the data model, or both. These data models and instructions may be received from a computer or other control device coupled or networked to the 3-D printer. In other embodiments, the computer is separate from or not connected to the 3-D printer, and the code is conveyed to the 3-D printer or controller by other means.

The computer or other control device in this example may be a server, a CAD workstation, a laptop, or other computing device. The 3-D printer's controller 168 may compile the instructions or analyze the data model from the computer as necessary, and/or it may directly recognize the received instructions in a compiled form and thus directly execute the instructions to build a 3-D object. Thus, the controller 168 in the 3-D printer can include components and circuitry sufficient to properly decipher the instructions from these external sources and to issue commands to activate, deactivate, and otherwise control operation of relevant components in the 3-D printer 100 based on the received instructions.

In an alternative exemplary embodiment, the external computer may be considered part of the 3-D printer itself, such as where the computer is integrated in the 3-D printer 100. In this event, the controller 168 may include both the integrated computer and the additional controller units, if any, distributed in the 3-D printer 100.

Powder Deposition Period. While in AM mode, the 3-D printer 100 may operate using alternating periods for depositing successive layers of print material and for selectively fusing portions of each layer of the deposited print material to solidify cross-sections of what is to become a physical representation of the data model upon completion of the print. The 3-D printer 100 may include a powder bed region 126 where a build piece 102 is ultimately formed. The 3-D printer 100 further includes features for depositing successive layers of the print material, which typically includes a metallic powder, in the powder bed region 126 during powder deposition periods.

Upon initiation of a 3-D print, powder bed region 126 is empty, and build plate 112 is located near the top surface 177. During a first powder deposition period, an initial layer of powder is deposited on the build plate. During each ensuing deposition period, the build plate 112 is lowered (arrow A) in increments proportional or equal to the desired width of a layer, and a successive layer of powder is deposited over the immediate prior layer. Numerous alternative powder deposition techniques are available in PBF-based printers.

In the embodiment of FIG. 1, 3-D printer 100 includes a depositor 164 for depositing successive layers of powder into the powder bed region 126. The depositor 164 in this embodiment includes a group of components acting in concert according to instructions from controller 168 to deposit a layer of powder during the powder deposition period. The depositor 164 may include a powder chamber, or hopper 148, for storing metal powder. The hopper 164 may also include a vertically slidable platform 170 at its base and an actuator 188 for moving the platform 170 upward in small increments (arrow B) once per powder deposition period as governed by the controller 168. The amount of incremental motion of the platform 170 may be proportional to a desired width of the layer of powder to be deposited. For the initial powder deposition period and each ensuing powder deposition period, the upward motion of platform 170 may cause an amount of powder to protrude from the hopper 164 that is needed for deposition of a layer having a predetermined width. In some embodiments, additional vertical side walls (not shown for clarity) may be disposed on opposite sides the hopper to avoid unwanted powder spillage to other regions of the 3-D printer.

The depositor 164 may further include a leveler 166 that is coupled to member 146. In this embodiment, member 146 may act as an actuator for moving (arrow C) leveler 166 across a surface of the hopper 164 and then the powder bed region 126. The leveler 166 in this embodiment pushes the powder protruding from the hopper 164 into the powder bed region 126, where it proceeds to move across the powder bed region in order to smoothen and level the surface of the powder to form a new horizontal layer. The new layer is deposited over the prior layer. As explained below, however, at least a portion of that prior layer will usually include a cross-sectional region of a solidified build piece, because the build piece is incrementally constructed layer-by-layer during a separate fusing period that occurs after each powder deposition period. The leveler 164 may then return to its initial position in preparation for the next powder deposition period.

The depositor may also include the substrate 144 and build plate 112 which are in turn coupled to a member 172 that acts as an actuator as described above to maintain the substrate 144 at an initially high level near the surface of 177 of the powder bed region 126 at the beginning stage of the print, and to gradually lower the build plate 112 in increments after each successive powder deposition period. The lowering of the build plate 112 is conceptually represented by the arrow A. At the end of the print, the build plate 172 is positioned such that substrate 144 may be disposed at a distance lower from the surface 177 in an amount proportional to the height of the build piece, wherein the powder bed region 126 includes both the desired build piece 102 and the unfused powder layers that remain (discussed below).

For example, the hopper 148 and leveler 166 may act in concert to form a layer during a powder deposition period. Thereupon, the controller 168 may switch the 3-D printer to a fusing period wherein portions of the layer are selectively fused as described below. Following the fusing period, the controller 168 may switch states back to a powder deposition period in which the build plate 112 is incrementally lowered to make room for deposition of the next layer. In some embodiments, the build plate 112 is lowered prior to the fusing period at the end of the powder deposition period. In this latter embodiment, the lowering of the build plate can be considered to be the last step of the powder deposition process, after which fusing begins. In either case, the end result is typically the same.

In sum, during the powder deposition period, the controller 168 in this embodiment precisely coordinates the respective movements of the build plate 112 (arrow A), the platform 170 (arrow B), and the leveler 166 (arrow C) in order to deposit a plurality of successive layers starting at the substrate 144, wherein each layer has a precisely determined thickness obtained by the hopper and leveler actions (arrows B and C). All the while, the build plate 112 is lowered (arrow A) to make room for the next layer in the ensuing powder deposition period until the process is complete.

Fusing Period. In an embodiment, a fusing period may occur at the conclusion of each powder deposition period. During the fusing period, an energy source 142 may shoot a beam of energy, such as a laser beam, into a corresponding deflector 150. The deflector 150 may be precisely positioned in response to controller 168 instructions to direct the energy beam to strike a selected portion of the exposed layer in the powder bed region 126. Deflector 305 can, in the case of a laser beam, for example, include an optical system that uses reflection and/or refraction to manipulate the laser beam to scan selected areas to be fused.

The deflector 150 may be movable per the controller 168 such that the energy beam may be directed to strike any desired region along the plane of the exposed powder layer within the powder bed region 126. In various embodiments, the deflector 150 can include one or more gimbals and actuators that can rotate and/or translate the energy beam source to position the energy beam. In various embodiments, energy beam source 142 and/or deflector 150 can modulate the energy beam, e.g., turn the energy beam on and off as the deflector scans so that the energy beam is applied only in the desired areas of the powder layer. For example, in various embodiments, the energy beam can be modulated by a digital signal processor (DSP).

Upon striking a selected region of the layer, the deflected energy beam heats the powder at that region, causing the powder to melt into a so-called "weld pool". As the temperature of the weld pool drops, the powder in that region solidifies. The energy source 142 continues to traverse selected areas of the layer using deflector 150 to fuse and then solidify the portions of the region identified by controller 168. In various embodiments, a plurality of energy sources are instead used to increase the total surface area of fusing and/or to decrease the overall fusing time. In either case, the solidified regions of the layer represent a cross-section of a build piece 102.

Following each subsequent power deposition period, the energy source repeats the selective fusing process described above such that selected regions in the powder layers are solidified. At the end of the AM process, the build plate 112 is at its lowest point to accommodate one or more completed build pieces 102, which represent objects having the geometrical, physical and structural attributes of the data model upon which the build piece 102 is based.

In some embodiments, the completed build piece is surrounded by unfused powder, which can be vacuumed out of the powder bed region using a variety of techniques.

The frame portions 162a, 162b, in addition to supporting the various components of the 3-D printer, may provide a chamber that can enclose the components, thereby protecting the equipment, enabling atmospheric and temperature regulation, and mitigating contamination risks. The internal chamber created by the frame may also enable the AM process to be conducted in an environment filled with an inert gas such as helium or argon. The use of an inert gas generally prevents the print material from oxidizing with atmospheric gasses or other unwanted chemical reactions that may otherwise be an undesirable side effect of the high temperatures and materials involved.

Referring still to FIG. 1, a robotic arm 106 is mounted on the upper portion 162a of the frame and moves pursuant to commands provided by controller 168. In an exemplary embodiment, the arm 106 has multiple degrees of freedom and therefore the effector end 114 of the arm 106 can be mobilized in any direction in the (x, y z) Cartesian coordinate system. In addition, the effector end 114 in one embodiment can be configured to rotate from 0 to $2\pi$ radians.

In an embodiment, the arm 106 is also capable of translational movement using a pad 190 with spherical rollers. In this simplified view shown for clarity, the roller pad 190 is shown with rollers running across the frame such that the arm 106 is capable of translating to different orientations to best access the component at issue. However, to maintain a closed environment for the printer, the arm may be coupled to an internal portion of the frame such that the firm maintains a similar degree of translational motion capability. In other embodiments, the arm may be coupled to the 3-D printer 100 using different structures.

In still other embodiments, particularly in larger devices, additional robotic arms may be included in the 3-D printer 100. In still other embodiments, multiple powder bed regions may be included with independent depositors and associated energy sources to enable simultaneous rendering of multiple build pieces. In various exemplary embodiments, AM can be interrupted on one or more of the multiple build pieces to enable a non-print operation to be conducted. Further, in various exemplary embodiments, one or more non-print operations may be performed on the build piece 102, and thereafter, AM of that build piece may resume as necessary. In other embodiments, each of the multiple build pieces may be connected together to be part of the same assembly when the overall process is complete, optionally along with other components such as commercial off-the-shelf (COTS) parts placed within the chamber prior to initiation of the build.

As noted above, the arm 106 can be configured via software to conduct one or more non-printing operations and if necessary, to don the appropriate end effector. For example, end effector 114 may be used to pick up and reposition the build piece 102 to another section of the printer, e.g., outside of the print bed region 126, to facilitate access to the build piece 102. The arm 106 may also include effectors or channels within for vacuuming and removing excess powder, end effectors for the wholesale cutting of large build pieces, and other types of effectors. The effectors may be organized on a wall of the chamber for quick access by arm 106. In various exemplary embodiments, the arm 106 may include a hydraulic pressure system and may be configured to provide a strong insertion force of an object handled by effector 114 into a suitable cavity or recess.

The arm 106 may also include effectors for performing more fundamental tasks including drilling, driving screws, tightening and loosening bolts, etc. The arm 106 may also be configured to don a grinder effector for grinding down desired portions of a build piece. The arm 106 may also be configured to apply an adhesive. For example, one or more channels may be routed through the internal portion of the arm 106 to carry adhesive and/or negative pressure to an end effector designed to interface with a suitably-oriented build piece. Alternatively, the arm 106 may don an effector that includes adhesive channels and ports routed from a different source, such as a source positioned on a side of the 3-D printer. These connective abilities of the arm 106 may be useful in combining different build pieces where the application requires a connection other than by AM.

Where a plurality of robotic arms are available, especially in a larger 3-D printer, a larger number of non-print manufacturing procedures may be possible. In some embodiments, AM can be conducted on a build piece, while one or more non-print operations can concurrently be conducted, e.g., on a previously printed build piece using arm 106 and a suitable effector, with each arm working toward the ultimate construction of a single assembly incorporating all the constituent parts.

When non-print operations are completed, the arm 106 may optionally re-orient the build piece 102 in the powder bed chamber 126 (or reinsert the build piece 102 if it was removed) to prepare it for a subsequent stage of AM.

The 3-D printer of FIG. 1 further includes an arm 104 that may function as a cutting tool. In an embodiment, cutting tool 104 may be configured to precisely cut large portions from a build piece, where desired. In an embodiment, arm 104 may also be calibrated to very precisely mill defined areas of structures. With the cooperation of arm 106 holding build piece 102 in a fixed, known precision, arm 104 can perform precise machining operations on build piece 102 within a range of tolerances that may be much smaller than the capability of the AM operation. In other embodiments, arm 104 may have additional capabilities and features. For example, where a cutting function is not necessary at a particular time, arm 104 may be capable of using other effectors and may cooperate with arm 106 to manipulate a build piece in preparation for a specific non-print operation.

Arm 104 may be similarly attached to an upper portion 162a of the frame using a pad/roller combination similar to the roller pad 190 used for arm 106. This feature enables the arm 104 to move to a necessary position with the print chamber. Other structural connections are also possible. Depending on the complexity of the arm 104 and its functions, it may include additional degrees of freedom, either along its longitudinal axis or just at its cutting effector at the end of arm 104. For example, the cutting effector may be configured to rotate at an angle relative to the upper portion 162a of the frame to cut a build piece at an angle other than horizontal.

FIG. 1 further includes multi-material depositor and vacuum 158. In various exemplary embodiments, it is desirable to use a plurality of materials for additively manufacturing build pieces to be used in an assembly under construction. As a result, depositor 158 may be configured to enable insertion of one or more additional print materials. These print materials may constitute different alloys or different metals altogether. The print materials may be fed (e.g., in sequence) using an automated or manual process to a feed storage area 160. The print material may then be provided to the hopper 148, if empty, via one or more dedicated channels (omitted for clarity). Depositor 158 may be implemented in a manner such that the integrity of the print chamber as an isolated environment is not compromised. Depositor 158 advantageously enables the 3-D printer to construct an assembly that is composed of entirely different materials. Because galvanic corrosion may become a concern where certain dissimilar materials are in potential contact due to their close proximity, the 3-D printer may be configured to produce one or more isolators for use with the assembly. Alternatively, a plastic or nylon substance may be provided in a dedicated location accessible to the robotic arm such that one or more isolators may be constructed out of larger pieces using conventional milling. In other embodiments for expediency, the isolators may be pre-made and ready for manipulation and placement by the arm 106 into appropriate portions of an assembly.

Depositor 158 may additionally or alternatively operate as a vacuum source. Because many PBF processes inevitably result in layers of unfused powder that may otherwise interfere with an intended non-print operation, a vacuum source 158 may operate to remove excess powder from the powder bed chamber. For example, conical region 110 may provide a strong vacuum force that causes unfused powder to flow to region 110 and thereafter into storage area 160. In an embodiment, the device 158 can function either as a feed for different print materials or as a vacuum source to collect and, where desired, reuse, unfused powder.

FIG. 2A-D illustrate portions of a 3-D printer 200 performing steps in sequence using additive and conventional manufacturing operations to construct an assembly including one or more build pieces or portions thereof, in accordance with an exemplary embodiment. As with FIG. 1, FIGS. 2A-D are not necessarily drawn to scale, but rather to provide clarity for important features of the disclosure.

Figure 2A:
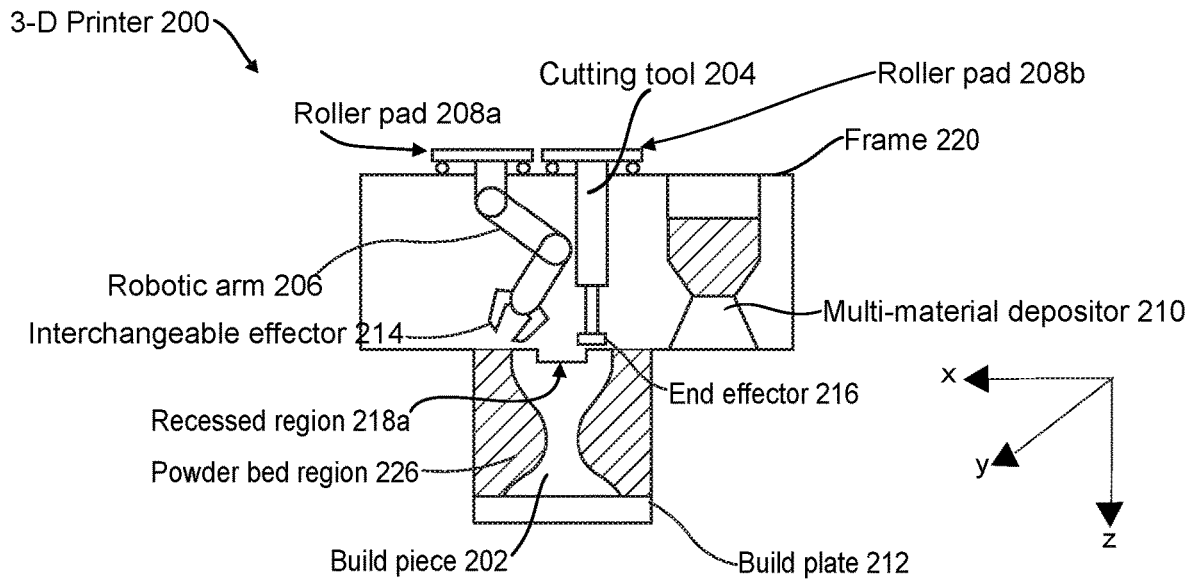
FIG. 2A-D are portions of a 3-D printer performing steps in sequence using additive and conventional manufacturing operations to construct an assembly including one or more build pieces or portions thereof, in accordance with an exemplary embodiment.

Referring initially to FIG. 2A, a portion of a 3-D printer 200 is shown. The 3-D printer is shown for clarity as positioned relative to a Cartesian coordinate system with x as the horizontal (in plane) component, y as the component extending vertically out of the plane of the drawing, and z as the downward component. The 3-D printer includes robotic arm 206 mounted to frame 220 via roller pad 208a. Roller pad 208a enables the arm 206 to translate to different positions in the printer as described above. In addition, arm 206 includes multiple degrees of freedom including along all three coordinate axes x, y, and z. Arm 206 further includes an exemplary interchangeable effector 214 configured for strong, steady, and very precise handling and orientation of AM structures.

3-D printer 200 further includes cutting tool 204. Cutting tool 204 may be mounted to or suspended from frame 220 or another structure using a roller pad 208b similar in function to the roller pad 208a of arm 206. Thus, cutting tool 204 may be capable of translation to different locations within the chamber. Other physical connections are possible. In some embodiments, cutting tool 204 may have additional degrees of freedom to increase its flexibility and precision. Alternatively, cutting tool 204 may rely on the flexibility and precise orientation capabilities of the robotic arm 206 to position a structure for cutting tool 204. In that case, cutting tool 204 may perform operations on a build piece suspended from effector 214 at a very specific orientation. This position information can be communicated to arm 204 via a controller.

Cutting tool 204 includes an end effector 216 which in this embodiment is capable of performing high precision machining operations. As noted above, to machine an AM part, arm 206 may act in concert with cutting tool 204 and end effector 216 to achieve precise machining of build piece 202. In some embodiments, end effector 216 has additional degrees of freedom such that, for example, it can rotate at an angle to provide further milling flexibility. Cutting tool 204 may also include a telescopic structure in an exemplary embodiment, such that end effector 216 is capable of extending inward closer to the upper frame portion, or downward over and/or into the powder bed region 226, depending on the position of the structure to be machined.

Multi-material depositor 210 is also shown in FIG. 2A. In various embodiments, depositor 210 employs the functions as described with respect to depositor 158, storage area 160, and conical region 110, above, as shown in FIG. 1. Thus, depositor 210 may also operate in a vacuum mode according to an embodiment. While depositor 210 is shown to the right of cutting tool 204 and powder bed region 226 in the print chamber, this location is for convenience only, and the depositor may in fact be located to the left, or otherwise in an optimal position to provide additional material to a hopper (not shown) or to remove excess powder using a vacuum. In various embodiments, depositor 210 may include one or more channels that extend to an area proximate the powder bed region 226 to facilitate effective removal of excess powder where necessary.

As shown by the slanted lines, powder bed region includes unfused powder along with the build plate 212 which supports the powder and build piece 202 during the AM operation. In this embodiment, build piece 202 was constructed during an initial AM operation to include a recessed region 218a at its surface.

Figure 2B:
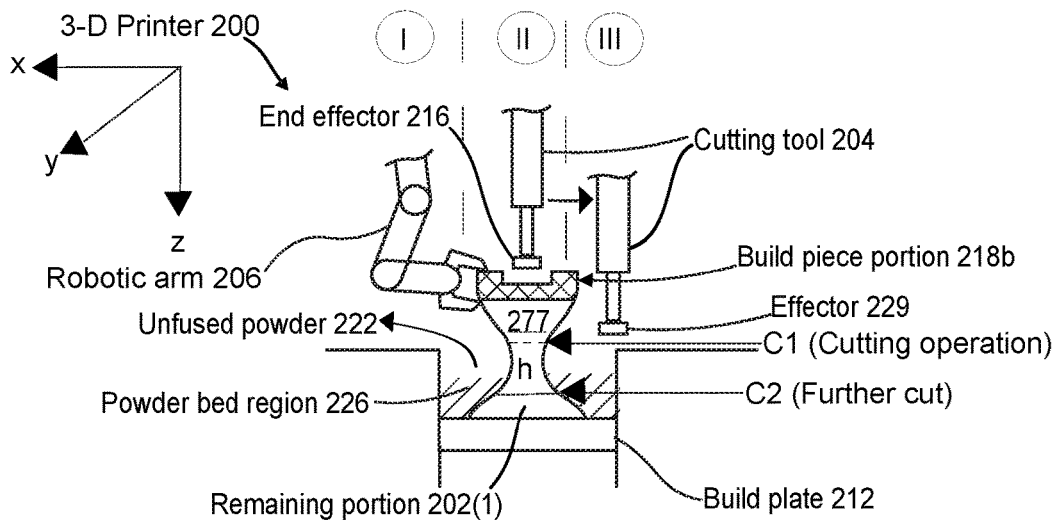

FIG. 2B shows relevant portions of the 3-D printer 200 of FIG. 2A after 3-D printing of build piece 202 is interrupted by the controller to perform a machining operation. FIG. 2B shows specific events at different points in time delineated by stages I, II and III. In this embodiment, events occurring during stages I and II may partially overlap. Upon interruption of the AM process, the chamber is prepared for machining operations. In an exemplary embodiment, depositor 210 (FIG. 2A) initiates a vacuum to remove part or all of the unfused powder present in powder bed region 226, as illustrated by the arrow 222 in FIG. 2B. Removal of the powder enables arm 204 to grasp and reposition the build piece as necessary to expose its designated portion to tool 204 for an accurate machining operation, without internal resistance from powder in the powder bed region 226.

Referring back to FIG. 2A, build piece 202 is 3-D printed to include an indentation 218a. For purposes of the application at issue, it is assumed that the level of precision required for the indentation is higher than the maximum level of precision that can be obtained using AM. Thus, the indentation 218a is initially manufactured and 3-D printing is interrupted to conduct more precise operations.

Referring again to FIG. 2B, the arm 206 may use effector 214 to grasp a desired portion 218b of build piece 202. At stage 2, arm 204 initiates a machining operation on the highlighted portion 218b. Cutting tool 204 may use subtractive manufacturing to mill portion 218b to a desired shape that falls within a prescribed tolerance range. The machining may involve anything from more straightforward high precision removal of material to more sophisticated shaping of the portion including, for example, adding features such as geometrical shapes, grooves, curvatures, and the like. In an exemplary embodiment, the arm 206 may coordinate with tool 204 by gradually repositioning the build piece 202 to expose necessary regions of the portion 218b. Alternatively or additionally, tool 204 may move to different positions using roller pad 208b. Effector 216 may be adapted to perform fine milling on small scales.

Once the machining of portion 218b is completed, in stage 3, cutting tool 204 may switch optionally effectors with assistance of arm 206, e.g., from effector 216 to 229. Where effector 216 may be used for high precision milling, effector 229 may have a larger blade more suitable for cutting larger portions of a structure. In other embodiments, one effector may suffice for conducting both types of cutting operations.

Cutting tool 204 is repositioned per controller instruction to a lower portion of build piece 204, where it severs the upper portion 277 from the build piece 202. The cutting operation is illustrated by the arrow C1 pointing to the dashed line, where the cut is made. The resulting part 277 includes the machined portion 218b (but does not include the region indicated h, the latter of which remains part of the original build piece 202). It should be noted that in stages II and III, the same cutting tool 204 is illustrated at different points in time. In various embodiments, however, one or more additional cutting tools 204 may be included for increasing machining speed or for concurrently machining multiple parts.

After part 277 is cut, the part 277 may be moved by arm 206 to a dedicated location of the chamber away from the powder bed region 226 for later use. In an exemplary embodiment, prior to terminating the machining operation, cutting tool 204 may optionally return to the remaining portion of the build piece 202 on build plate 212 and cut an additional portion designated "h" away at the line indicated by arrow C2. The purpose of this cut is to resize the remaining portion 202(1) of the build piece to prepare the part 202(1) for further AM operations. The severed region designated "h" may be moved by the arm 206 and stored in a dedicated region for possible future use or for recycling.

Thus, in this embodiment, what remains on the build plate 212 is part 202(1). AM resumes to conduct a second AM operation (described below) in which additional material is deposited on part 202(1) to form a part having a different shape. It is noteworthy that in some embodiments, the original build piece 202 may initially be shaped at the outset to conform to the expected shape of later parts derived from original build piece 202, such that the additional cutting operation C2 of FIG. 2B may not be necessary.

Figure 2C:
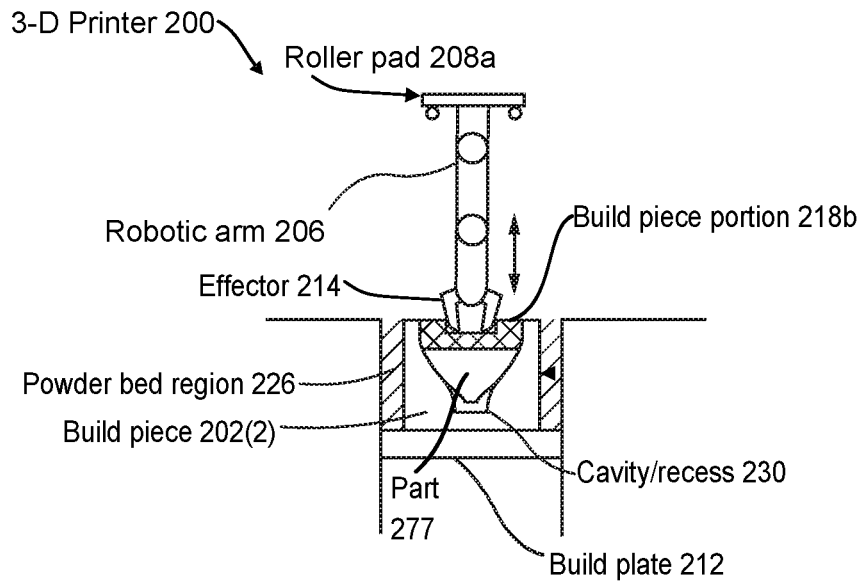

FIG. 2C shows a portion of the 3-D printer 200 with build piece 202(2). While not shown to scale, build piece 202(2) may include part 202(1) with additional material fused onto the part in a second AM operation that resumed 3-D printing atop structure 202(1). That is, in FIG. 2C, build piece 202(2) includes the part 202(1), which part has been further 3-D printed in the second AM operation to include the upward protrusions on each side and the cavity or recess 230 formed in the middle.

In an alternative embodiment, depending on the desired shape of the parts, one or both cutting operations C1, C2 may be omitted. However, it some instances it may be difficult to avoid at least one cutting operation in situations where, for example, the initially required AM part is unstable on the build plate, or requires support material, etc.

In still another embodiment, instead of performing cutting operation C2, the entire remaining portion of build piece 201 in FIG. 2B (including portion 202(1) and region "h") may be removed by arm 206, and a new AM operation may commence from the ground up to result in build piece 202(2) of FIG. 2C. In sum, the techniques described in this disclosure accord significant flexibility by enabling the 3-D printer to switch between AM and machining modes to create an ideal part with maximum efficiency.

Referring back to FIG. 2C, once build piece 202(2) is complete, the AM process is again interrupted in response to controller instructions. Robotic arm 206 may then position itself accordingly to re-acquire part 277. Using effector 214 to grip the machined portion 218b of part 277 using an outward force, arm 206 may insert part 277 into cavity 230 of build piece 202(2) and press the structure into the part until it is securely locked into place within the cavity, e.g., by the shear, compressive, and/or frictional forces generated by the press. The press-fitting action may also change the shape of part 202(2).

In alternative embodiments an intermediary operation may involve applying an adhesive into cavity 230, with or without the assistance of vacuum. In still other embodiments, a sealant may be applied to contain the adhesive. In yet other embodiments, isolators may be applied to alleviate potential galvanic corrosion concerns. Each of these operations, where necessary, may be performed by a mechanical arm (e.g., arm 206) within the print chamber based on controller instructions and/or by dedicated equipment for delivering adhesive or other substances.

In the embodiment shown, the part 277 is press fit into the cavity 230 of build piece 202(2) using enough compressive force to permanently position the part 277 within the cavity, with the machined portion facing up. In an exemplary embodiment, arm 206 may include a hydraulic press for applying additional force. In either event, the result is a part 277 securely and permanently press-fit into the build piece 202(2). The applied force may substantially reshape cavity 230 to accommodate the part 277.

Figure 2D:
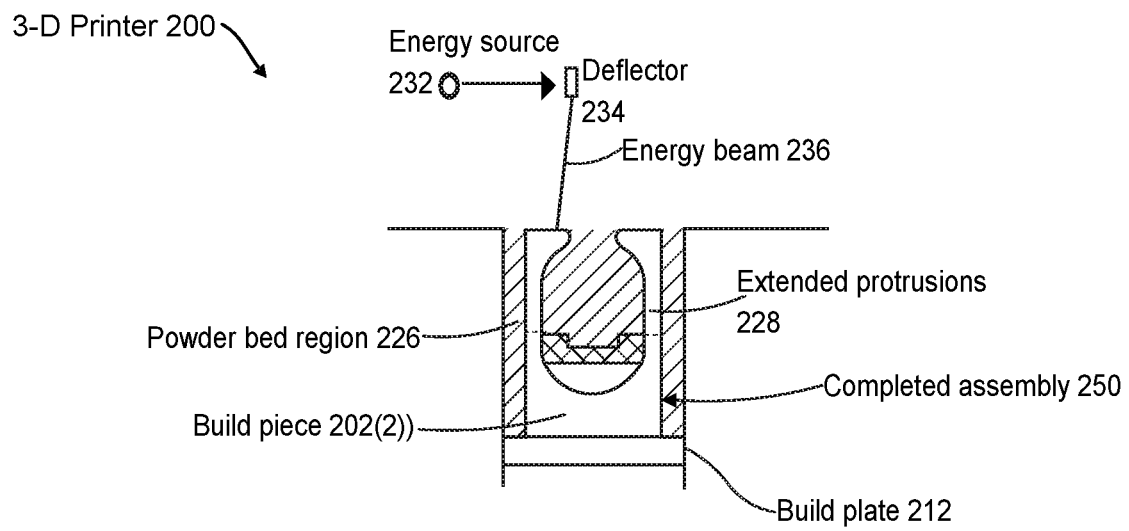

The controller may terminate the pressing operation shown in FIG. 2C and may thereupon resume AM operations. In particular, the part 202(2) with its modified shape may be used as a basis for further AM. FIG. 2D shows a portion of the 3-D printer 200 in which AM has resumed on part 202(2). As is evident from the illustration, the shape of part 202(2) has changed as a result of the pressing operation of FIG. 2C. FIG. 2D also shows powder bed region 226 as additional layers are added. Specifically, energy source 232 emits an energy beam 236 at deflector 234, which selectively fuses regions on the part 202(2). In this embodiment, 3-D printer forms extended protrusions 228 on each side of reshaped part 202(2) to ultimately construct assembly 250. Assembly 250 includes part 202(2) as reshaped during the press operation, part 277 (including machined portion 218b) as embedded into part 202(2), and additively manufactured protrusions 228 that uniformly extend upward from part 202(2). The constructed assembly 250 may be a single integrated piece.

Completed assembly 250 can be removed and, for example, inserted into a vehicle or other transport structure to effectuate its intended application. Because the entire assembly was constructed in a single chamber using a series of automated robotic arms, energy sources, and other structures, all following a sequence of instructions from a controller, the part can be manufactured in a more efficient and cost-effective manner.

Figure 3:
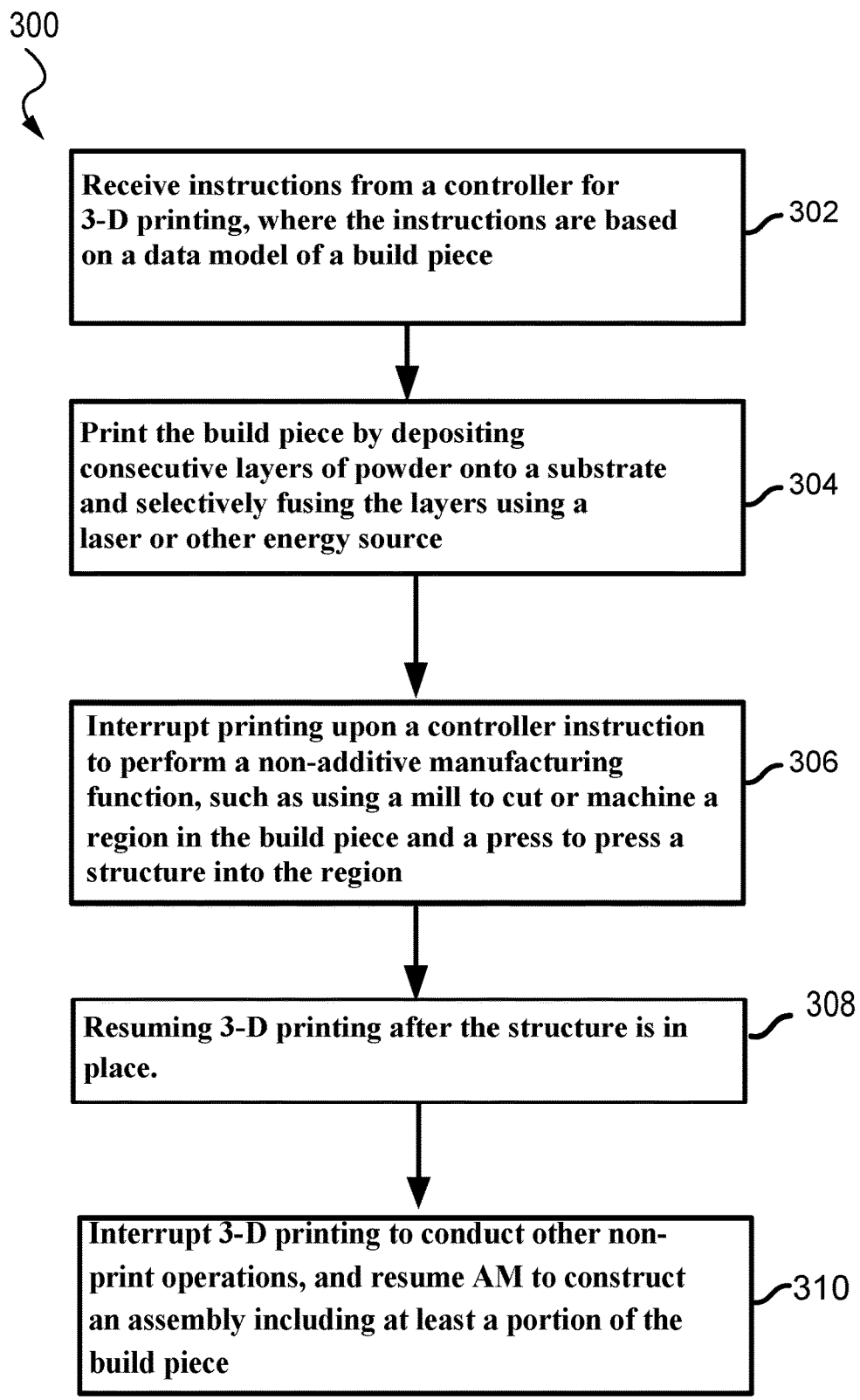
FIG. 3 is flow diagram of a method for constructing an assembly including one or more build pieces or portions thereof, in accordance with an exemplary embodiment.

FIG. 3 is a flow diagram 300 illustrating an exemplary method for constructing an assembly including one or more build pieces or portions thereof, in accordance with an exemplary embodiment. A 3-D printer may receive instructions from a controller to 3-D print a part, wherein the instructions are based at least in part on an original data model of a desired build piece, or of an assembly of which the build piece is a part (302). Thereupon, the 3-D printer additively manufactures the build piece, for example, by depositing consecutive layers of powder onto a substrate and by selectively fusing the layers using a laser, electron beam, etc. (304)

Additive manufacturing may thereafter be interrupted at an appropriate time pursuant to controller instructions, in which a non-AM function, such as using a mill to machine a region of the build piece and, in that step or a subsequent step, using a press to press-fit a structure into the region (306). Thereafter, AM resumes upon controller command when the structure is securely press-fit into place (308). At this point, the desired assembly may be constructed once the AM operation is completed. Optionally, where desired, AM operations may be interrupted to accomplish further non-print functions as necessary, including milling, pressing, adhering, or the like. AM operations may thereafter continue to construct an assembly including at least a portion of the build piece (310).

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A three-dimensional (3-D) printer, comprising:
   a frame including a substrate enclosed by walls to define a powder bed region;
   a depositor for successively depositing layers of powder in the powder bed region;
   an energy source configured to selectively fuse the deposited layers of powder to form a build piece based on instructions from a controller, wherein the build piece comprising a cavity;
   a tool configured to remove a portion of the build piece; and
   a robotic arm configured to insert the portion of the build piece into at least a portion of the cavity of the build piece, and apply an adhesive and a sealant, wherein the sealant is applied to contain the adhesive.

2. The 3-D printer of claim 1, wherein the portion of the build piece comprises a machined portion.

3. The 3-D printer of claim 1, wherein 3-D printing of the cavity is performed after removal of the portion of the build piece.

4. The 3-D printer of claim 1, wherein the energy source is configured to be interrupted prior to removal of the portion of the build piece and resume fusing a remaining portion of the build piece after removal of the portion of the build piece.

5. The 3-D printer of claim 1, wherein the energy source and depositor are configured to be interrupted prior to removal of the portion of the build piece.

6. The 3-D printer of claim 1, wherein the depositor is configured to successively deposit new layers of powder onto the build piece on the substrate in the powder bed region after removal of the portion of the build piece, and
   the energy source is configured to fuse the new layers of powder onto the build piece to form a new build piece.

7. The 3-D printer of claim 5, wherein the energy source and depositor are configured to resume 3-D printing of the build piece after insertion of the portion to construct an assembly.

8. The 3-D printer of claim 1, wherein the robotic arm comprises a computer numerically controlled (CNC) mill configured to remove at least a region of the build piece.

9. The 3-D printer of claim 2, wherein the tool forms the machined portion.

10. The 3-D printer of claim 8, further comprising a vacuum configured to remove, between fusing operations, excess powder generated by the CNC mill.

11. The 3-D printer of claim 1, wherein the robotic arm is configured to remove excess powder from a region identified by the controller.

12. The 3-D printer of claim 1, wherein the robotic arm comprises a component of a hydraulic circuit for pressing the portion of the build piece into the cavity of the build piece.

13. The 3-D printer of claim 1, wherein the robotic arm comprises one or more robotic arms configured to perform one or more of hydraulic pressing, powder removal, milling, and machining.

14. The 3-D printer of claim 1, wherein the robotic arm includes one or more of one or more channels for vacuuming and removing excess powder, and one and more end effectors for preforming operations on the build piece.

15. The 3-D printer of claim 1, wherein the depositor is configured, after insertion of the portion, to deposit additional successive layers over the portion, and the energy source is configured to fuse the additional successive layers such that the portion is trapped in an assembly.

16. The 3-D printer of claim 15, wherein the portion is at least a bearing, a captive nut, or a bolt.

17. The 3-D printer of claim 1, wherein the energy source is configured to be interruptible such that fusing the deposited layers of powder is terminated to mill the build piece, to press the portion into the cavity of the build piece, and to thereafter resume 3-D printing of the build piece to construct an assembly.

18. A three-dimensional (3-D) printer, comprising:
    a frame;
    a powder bed region arranged in a lower portion of the frame;
    a depositor configured to deposit print material into the powder bed region;
    an energy source configured to selectively fuse successive layers of the deposited print material to form a build piece, wherein the build piece comprising a cavity or recess;
    a tool configured to remove a portion of the build piece;
    a robotic arm configured to insert the portion of the build piece into at least a portion of the cavity or recess of the build piece, and apply an adhesive and a sealant, wherein the sealant is applied to contain the adhesive; and
    a controller configured to interrupt fusing by the energy source to enable the robotic arm to perform the insertion of the portion and thereafter to enable resuming the fusing.

19. The 3-D printer of claim 1, wherein the controller is configured to interrupt fusing by the energy source to enable the robotic arm to perform the insertion of the portion of the build piece and thereafter to enable resuming the fusing.

20. The 3-D printer of claim 18, wherein the tool includes an end effector for performing a machining operation on the portion of the build piece.

21. The 3-D printer of claim 18, wherein the tool mills the build piece to a shape that falls within a prescribed tolerance range.

* * * * *